United States Patent
Kogure et al.

(10) Patent No.: US 7,697,206 B2
(45) Date of Patent: Apr. 13, 2010

(54) PRISM-INTEGRATED LIGHT-DIFFUSING PLATE AND METHOD OF MANUFACTURE

(75) Inventors: Masami Kogure, Ichihara (JP); Hiroshi Kawato, Ichihara (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 581 days.

(21) Appl. No.: 11/578,550

(22) PCT Filed: Apr. 28, 2005

(86) PCT No.: PCT/JP2005/008138

§ 371 (c)(1), (2), (4) Date: Oct. 16, 2006

(87) PCT Pub. No.: WO2005/109045

PCT Pub. Date: Nov. 17, 2005

(65) Prior Publication Data

US 2007/0195418 A1    Aug. 23, 2007

(30) Foreign Application Priority Data

May 11, 2004   (JP) ............... 2004-140838

(51) Int. Cl.
*G02B 5/02* (2006.01)

(52) U.S. Cl. .............. 359/599; 428/323; 362/339; 362/355

(58) Field of Classification Search ............. 359/599; 362/620, 626, 337, 339, 355; 428/323
See application file for complete search history.

(56) References Cited

U.S. PATENT DOCUMENTS

| 5,844,720 | A | * | 12/1998 | Ohara et al. | 359/599 |
| 6,318,866 | B1 | | 11/2001 | Mimura et al. | |
| 6,417,831 | B2 | * | 7/2002 | Kashima | 345/102 |
| 6,917,469 | B2 | | 7/2005 | Momose et al. | |
| 2004/0061944 | A1 | * | 4/2004 | Kashima et al. | 359/599 |
| 2004/0263966 | A1 | | 12/2004 | Momose et al. | |
| 2005/0257363 | A1 | * | 11/2005 | Li et al. | 29/527.1 |
| 2007/0201246 | A1 | * | 8/2007 | Yeo et al. | 362/627 |

FOREIGN PATENT DOCUMENTS

| JP | 57 18251 | | 1/1982 |
| JP | 61057902 A | * | 3/1986 |
| JP | 08 015780 | | 1/1996 |
| JP | 9-304606 | | 11/1997 |
| JP | 09304606 A | * | 11/1997 |

(Continued)

*Primary Examiner*—Alessandro Amari
*Assistant Examiner*—Mark Consilvio
(74) *Attorney, Agent, or Firm*—Oblon, Spivak, McClelland, Maier & Neustadt, L.L.P.

(57) ABSTRACT

The present invention provides a prism-integrated light-diffusing plate, characterized in that a prismatic portion formed of a plurality of prism-shaped protrusions is provided on at least one surface of a light-diffusing sheet which is formed of a transparent resin material containing a light-diffusing agent and which has a thickness of 0.5 to 3 mm and a total light transmittance of 60 to 95%. The prism-integrated light-diffusing plate serves as both a prism sheet and a light-diffusing plate, diffuses light uniformly, and increases the brightness of an illumination cover or a liquid crystal display backlight for a large screen.

16 Claims, 2 Drawing Sheets

FOREIGN PATENT DOCUMENTS

| | | |
|---|---|---|
| JP | 10 160914 | 6/1998 |
| JP | 2000-15712 | 1/2000 |
| JP | 2000 066307 | 3/2000 |
| JP | 2001-202814 | 7/2001 |
| JP | 2001 318432 | 11/2001 |
| JP | 2002-86461 | 3/2002 |
| JP | 2003-75638 | 3/2003 |
| JP | 2003 240921 | 8/2003 |
| JP | 2005-37924 | 2/2005 |
| WO | 2004 097466 | 11/2004 |

\* cited by examiner

PRISM-INTEGRATED LIGHT-DIFFUSING PLATE AND METHOD OF MANUFACTURE

This application is a 371 of PCT/JP05/08138 filed Apr. 28, 2005.

FIELD OF THE INVENTION

The present invention relates to a light-diffusing plate including a prismatic portion (hereinafter the plate may be referred to as a "prism-integrated light-diffusing plate"), and more particularly to a prism-integrated light-diffusing plate which is employed in liquid crystal display backlight devices or illuminating devices including a light source such as a fluorescent tube, an LED, or an EL. Specifically, the present invention relates to a prism-integrated light-diffusing plate which serves as both a prism sheet and a light-diffusing plate, and which uniformly diffuses light at increased brightness.

BACKGROUND ART

In a conventional large-screen liquid crystal display, a light-diffusing plate is provided so as to eliminate the lamp image of a light source (e.g., a fluorescent tube) of a backlight unit.

The light-diffusing plate is required to have such properties as to diffuse light transmitted therethrough over a wide angular range with respect to a direction perpendicular to the plate.

In order to illuminate the entire surface of a liquid crystal unit with the thus-transmitted light at high brightness, generally, at least one prism sheet is provided between the liquid crystal unit and the light-diffusing plate, which serves as a support of the prism sheet.

The prism sheet is provided for convergence or diffusion of light within an angular range effective for increasing brightness.

However, in some cases, during the course of assembly of the backlight unit of the liquid crystal display, two prism sheets must be provided in combination with an additional functional film (e.g., light-diffusing film or retardation film), thereby requiring a prolonged and intricate process and resulting in an increase in production cost attributed to the prism sheets.

In view of the foregoing, for the purpose of elimination of such a prism sheet, demand has arisen for a prism-integrated light-diffusing plate which serves as both a functional film and a light-diffusing plate (thick plate having a thickness of 0.5 to 3 mmt).

There has been proposed a light-diffusing prism sheet produced by forming microprotrusions having a serrate cross section on at least one surface of a light-diffusing sheet containing a transparent resin (100 parts by mass) and cross-linked acrylic resin beads having a mean particle size of 1 to 20 µm (0.5 to 10 parts by mass) (see, for example, Patent Document 1).

Although this technique is proposed for the purpose of provision of a light-diffusing prism sheet serving as both a light-diffusing film and a prism sheet, the technique is not applied to a thick light-diffusing plate which is employed particularly in a large-screen liquid crystal TV (17 inches or more) and which serves as both a light-diffusing layer and a supporting layer.

As has been known, even when a prism pattern is transferred onto a conventional light-diffusing plate which is employed in a direct-type backlight, the thus-formed prismatic portion fails to exhibit light converging effect, due to high light diffusivity of the plate.

Patent Document 1: Japanese Patent Application Laid-Open (kokai) No. 9-304606

DISCLOSURE OF THE INVENTION

An object of the present invention is to provide a prism-integrated light-diffusing plate which serves as both a prism sheet and a light-diffusing plate, which diffuses light uniformly, and which increases the brightness of an illumination cover or a liquid crystal display backlight for a large screen.

In order to achieve the aforementioned object, the present inventors have conducted extensive studies, and as a result have found that when a prism pattern is transferred onto a light-diffusing sheet which reduces the diffusivity of light transmitted therethrough and has a certain transmittance range, the resultant prism-integrated light-diffusing plate exhibits light diffusion/convergence performance sufficient for practical use. The present invention has been accomplished on the basis of this finding.

Accordingly, the present invention provides:

1. a prism-integrated light-diffusing plate, characterized in that a prismatic portion formed of a plurality of prism-shaped protrusions is provided on at least one surface of a light-diffusing sheet which is formed of a transparent resin material containing a light-diffusing agent and which has a thickness of 0.5 to 3 mm and a total light transmittance of 60 to 95%;

2. a prism-integrated light-diffusing plate as described in 1 above, wherein the amount of the light-diffusing agent contained in the transparent resin material is 0.1 to 20 parts by mass on the basis of 100 parts by mass of a transparent resin constituting the resin material;

3. a prism-integrated light-diffusing plate as described in 1 or 2 above, wherein the light-diffusing agent is formed of at least one species selected from among a thermoplastic acrylic resin, a polystyrene resin, a cross-linked acrylic resin, a cross-linked polystyrene resin, a silicone resin, a fluorocarbon resin, silica, and quartz, and the light-diffusing agent is in the form of particles having a mean particle size of 1 to 200 µm, and/or fiber having a length to diameter ratio (L/D) of 2 or more;

4. a prism-integrated light-diffusing plate as described in 1 above, wherein the prismatic portion is formed directly on the light-diffusing sheet;

5. a prism-integrated light-diffusing plate as described in 1 above, wherein the prismatic portion is formed through melt-adhesion of a transparent resin sheet onto the light-diffusing sheet;

6. a prism-integrated light-diffusing plate as described in 1 above, wherein, when light enters the surface opposite the surface having the prismatic portion in a direction perpendicular to the opposite surface, the ratio of intensity of transmitted light as measured in a direction 20° from the perpendicular direction to intensity of transmitted light as measured in the perpendicular direction; i.e., a light-intensity distribution indicator, is 0.02 to 0.7;

7. a method for producing a prism-integrated light-diffusing plate as recited in 4 above, which method is characterized by comprising an emboss-pattern-transfer step including placing a light-diffusing sheet on the surface of an embossing sheet having a prism pattern, and pressing the embossing sheet and the light-diffusing sheet by means of a pair of rollers provided on the respective sides of the opposite surfaces of the embossing sheet, to thereby transfer the prism pattern onto the light-diffusing sheet; a step of conveying the embossing sheet and the pattern-transferred sheet by means of an endless belt which is supported by at least one of the rollers; and a step of removing the pattern-transferred sheet from the embossing sheet after the conveying step; and 8. a method for producing a prism-integrated light-diffusing plate as recited in 5 above, which method is characterized by comprising an emboss-pattern-transfer step including providing a transparent resin sheet between a light-diffusing sheet and the surface of an embossing sheet having a prism pattern, and pressing the embossing sheet and the light-diffusing sheet by means of a pair of rollers provided on the respective sides of the opposite surfaces of the embossing sheet, to thereby transfer the prism pattern onto the transparent resin sheet, and to melt-adhere the resin sheet to the light-diffusing sheet; a step of conveying the embossing sheet and the pattern-transferred and melt-adhered sheet by means of an endless belt which is supported by at least one of the rollers; and a step of removing the pattern-transferred and melt-adhered sheet from the embossing sheet after the conveying step.

DESCRIPTION OF REFERENCE NUMERALS

Figure 1:
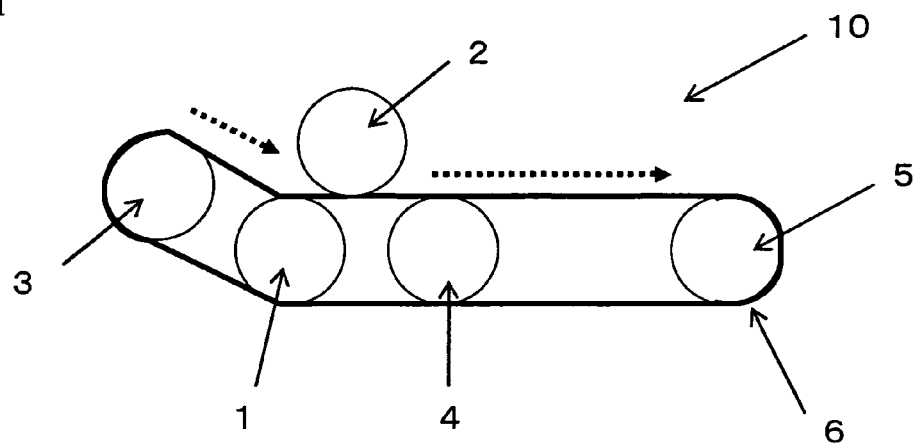
FIG. 1 is an explanatory view showing an example of a transfer apparatus for producing the prism-integrated light-diffusing plate of the present invention.

1. Heating roller
2. Rubber roller
3. Pre-heating roller
4. Cooling roller
5. Conveying roller
6. Endless belt
11. 20-inch backlight
12. Prism-integrated light-diffusing plate
13. Fluorescent tube
14. Deflection amount

BEST MODE FOR CARRYING OUT THE INVENTION

No particular limitation is imposed on the transparent resin constituting the transparent resin material employed in the present invention, so long as the transparent resin has a light transmittance of 80% or more, preferably 85% or more. From the viewpoint of thermal resistance, the transparent resin to be employed is preferably, for example, a polycarbonate resin, a poly cycloolefin resin, an acrylic resin, a polysulfone resin, a polyacrylate resin, or a polyethersulfone resin, the resin having a glass transition temperature or second-order transition temperature of 100° C. or higher.

Of these, a polycarbonate resin, an acrylic resin, and a poly cycloolefin resin are preferred.

Examples of the transparent resin sheet (prism sheet) employed in the present invention include a sheet formed of any of the aforementioned transparent resins.

The thickness of the resin sheet is 0.5 to 3 mm, preferably 0.6 to 2 mm.

A light-diffusing agent employed in the present invention is at least one species selected from among a cross-linked acrylic resin, a cross-linked polystyrene resin, a silicone resin, a fluorocarbon resin, silica, quartz, titanium oxide, and zinc oxide.

Preferably, the aforementioned light-diffusing agent is in the form of particles (beads or powder) having a mean particle size of 1 to 200 μm (preferably 3 to 100 μm), and/or fiber having a length to diameter ratio (L/D) of about 2 to about 100.

In the case where the aforementioned transparent resin is a polycarbonate resin, particularly preferably, the light-diffusing agent is a combination of thermoplastic acrylic resin particles, cross-linked acrylic resin particles, and quartz fiber.

In the present invention, the transparent resin material employed in a light-diffusing sheet contains a transparent resin in an amount of 100 parts by mass, and a light-diffusing agent in an amount of 0.1 to 20 parts by mass (preferably 0.5 to 15 parts by mass).

The thickness of the aforementioned light-diffusing sheet is preferably 0.5 to 3 mm, more preferably about 0.6 to about 2 mm.

In the case where the thickness of the light-diffusing sheet is 0.5 mm or more, when the sheet, which exhibits adequate rigidity, is incorporated into a direct-type backlight, the sheet does not deflect under its own weight but maintains its planarity.

In the case where the thickness of the light-diffusing sheet is 3 mm or less, optical properties thereof are not impaired, and the weight of the sheet is maintained at low level.

The total light transmittance of the light-diffusing sheet is 60 to 95%, preferably 65 to 93%.

When the total light transmittance falls within the above range, a prism-integrated light-diffusing plate sufficient for practical use is obtained.

The amount of the light-diffusing agent to be incorporated can be determined so as to regulate light diffusion performance in accordance with optical properties of a prismatic portion to be formed on a surface layer of the light-diffusing sheet.

No particular limitation is imposed on the prismatic portion to be formed on a surface layer of the light-diffusing sheet, so long as the prismatic portion formed on the light-diffusing sheet has such a shape that can converge or diffuse incident light from a light source, to thereby increase brightness and to reduce brightness unevenness.

For example, the prismatic portion may have a linear-, triangular-pyramid-, or quadrangular-pyramid-prismatic shape, a Fresnel lens-like shape, or a lenticular lens-like shape.

In the prism-integrated light-diffusing plate of the present invention, when light enters the surface opposite the surface having the prismatic portion in a direction perpendicular to the opposite surface, the ratio of intensity of transmitted light as measured in a direction 20° from the perpendicular direction to intensity of transmitted light as measured in the perpendicular direction; i.e., a light-intensity distribution indicator, is 0.02 to 0.7, preferably 0.1 to 0.6.

When the transmitted light intensity ratio (a light-intensity distribution indicator) is 0.02 to 0.7, the prism-integrated light-diffusing plate exhibits increased brightness and diffusivity.

When the transmitted light intensity ratio is less than 0.02, diffusivity is excessively low, and brightness unevenness increases.

Next will be described in detail a preferred embodiment of the production method for the light-diffusing plate of the present invention by taking, as a typical example, the case where the transparent resin is a polycarbonate resin.

Firstly, a light-diffusing agent is incorporated in a polycarbonate resin to prepare a transparent resin material; the resin material is subjected to drying treatment; and the thus-dried resin material is extruded by means of an extruder equipped with an apparatus for removal of volatile components (hereinafter the apparatus may be referred to as a "volatile-removing apparatus"), to thereby form a sheet.

The drying treatment is preferably performed at 120 to 140° C. for 2 to 10 hours, more preferably at 120 to 140° C. for 4 to 10 hours.

The drying treatment can be generally performed in, for example, a heated air atmosphere, a dry air atmosphere, or a vacuum atmosphere.

This drying treatment can remove moisture contained in the transparent resin or the light-diffusing agent, and as well most of volatile reaction by-products generated during preparation of the transparent resin material.

The extruder for sheet molding must have a volatile-removing apparatus.

The volatile-removing apparatus can be evacuated to a pressure equal to or lower than atmospheric pressure when the transparent resin material is in a molten state. During the course of extrusion, the volatile-removing apparatus is generally evacuated to 8 kPa or less, preferably 4 kPa or less.

This volatile removal under reduced pressure can remove moisture and volatile reaction by-products remaining in the transparent resin material, and as well additional volatile reaction by-products generated through extrusion.

When volatile removal is insufficient during the course of drying treatment and extrusion, foaming occurs in a light-diffusing sheet, or the surface of the sheet becomes rough, and thus the light-diffusing sheet fails to diffuse light uniformly.

During the course of sheet molding, the temperature of a die is generally regulated to 200 to 260° C., preferably 200 to 250° C., more preferably 200 to 240° C.

When the die temperature exceeds 260° C., the polycarbonate resin is prone to undergo thermal degradation, which may cause yellowing of the resultant sheet, leading to low light transmittance and poor appearance.

During the course of sheet molding, the temperature of a cooling roller is regulated to about 120 to about 180° C., preferably 120 to 170° C.

When the temperature of all the rollers to be employed is lower than 120° C., the molten transparent resin material exhibits high rigidity, and thus sizing is difficult to perform between nip rollers. Therefore, the surface homogeneity of the resultant light-diffusing sheet fails to be maintained in lateral and longitudinal directions, and the sheet is prone to diffuse light unevenly.

In contrast, when the temperature of all the rollers to be employed exceeds 180° C., the surface of the resultant sheet sticks or adheres to the rollers, and uneven peeling or warpage of the sheet tends to occur. Therefore, difficulty is encountered in producing a light-diffusing sheet which diffuses light uniformly (i.e., an intended product).

In the present invention, no particular limitation is imposed on the method for providing a prismatic portion formed of a plurality of prism-shaped protrusions on at least one surface of the aforementioned light-diffusing sheet. Examples of preferably employed methods include (1) a method for forming the prismatic portion directly on the light-diffusing sheet; and (2) a method in which a transparent resin sheet is melt-adhered to the light-diffusing sheet, and the prismatic portion is formed on the transparent resin sheet.

Other examples of the prismatic portion forming method include a method in which a prismatic portion is formed through injection molding or press molding by means of a die having a prism pattern; and a method in which a transparent thermosetting acrylic resin is applied to or injected in, for example, a die having a prism pattern, and a light-diffusing plate is attached onto the resin, and subsequently the thermosetting resin is cured through illumination with, for example, electron beams, radiation, or UV rays transmitted via the light-diffusing plate, or through heating, so as to form a prismatic portion, followed by removal of the thus-cured resin with being bonded to the light-diffusing plate, to thereby yield a prism-integrated light-diffusing plate.

The present invention employs, as the aforementioned method (1), a method including an emboss-pattern-transfer step including placing a light-diffusing sheet on the surface of an embossing sheet having a prism pattern, and pressing the embossing sheet and the light-diffusing sheet by means of a pair of rollers provided on the respective sides of the opposite surfaces of the embossing sheet, to thereby transfer the prism pattern onto the light-diffusing sheet; a step of conveying the embossing sheet and the pattern-transferred sheet by means of an endless belt which is supported by at least one of the rollers; and a step of removing the pattern-transferred sheet from the embossing sheet after the conveying step.

This method can employ a transfer apparatus shown in FIG. 1.

FIG. 1 is an explanatory view showing an example of a transfer apparatus for producing the prism-integrated light-diffusing plate of the present invention including a light-diffusing sheet having a prismatic portion. This apparatus 10 includes a pair of transfer rollers; i.e., a heating roller 1 and a rubber roller 2, a pre-heating roller 3, and a cooling roller 4 for cooling a prism-pattern-transferred sheet.

The apparatus 10 further includes an endless belt 6 which is supported around the heating roller 1 (transfer roller), the pre-heating roller 3, the cooling roller 4, and a conveying roller 5.

The present invention employs, as the aforementioned method (2), a method including a step of providing a transparent resin sheet between a light-diffusing sheet and the surface of an embossing sheet having a prism pattern, and pressing the embossing sheet and the light-diffusing sheet by means of a pair of rollers provided on the respective sides of the opposite surfaces of the embossing sheet, to thereby transfer the prism pattern onto the transparent resin sheet, and to melt-adhere the resin sheet to the light-diffusing sheet; a step of conveying the embossing sheet and the pattern-transferred and melt-adhered sheet by means of an endless belt which is supported by at least one of the rollers; and a step of removing the pattern-transferred and melt-adhered sheet from the embossing sheet after the conveying step.

This method also employs the aforementioned transfer apparatus shown in FIG. 1.

When the thus-produced prism-integrated light-diffusing plate is incorporated into a backlight unit, the plate is provided directly above a fluorescent tube serving as a light source.

Since the fluorescent tube generates, in addition to visible light, UV light, which degrades the resin, long-term use of the backlight unit may cause yellowing of the light-diffusing plate, leading to change in hue of a liquid crystal screen.

Therefore, preferably, the surface of the light-diffusing plate that faces the fluorescent tube is coated with transparent light-resistant film.

EXAMPLES

The present invention will next be described in more detail with reference to Examples and Comparative Examples, but the invention is not limited to the Examples.

A prism-integrated light-diffusing plate of the present invention was evaluated in terms of the following items.

(1) Total light transmittance: Total light transmittance was measured through the light transmittance measuring method described in JIS K7105.

(2) Average brightness: A prism-integrated light-diffusing plate was placed on a light box in which cold-cathode tubes (fluorescent tubes) were arranged in parallel, and brightnesses as measured directly above the fluorescent tubes by means of a calorimeter (product of Konica Minolta; former Minolta) and brightnesses as measured at a middle point between the fluorescent tubes by means of the calorimeter were averaged.

(3) Brightness unevenness: Brightness unevenness is the difference between the average of brightnesses as measured directly above the fluorescent tubes and the average of brightnesses as measured directly above middle points between the fluorescent tubes. The greater the difference, the greater the brightness unevenness.

Figure 2:
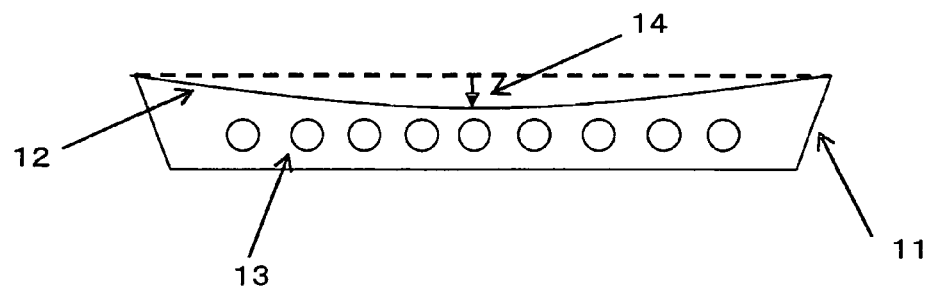
FIG. 2 is an explanatory view showing measurement of the amount of deflection of the prism-integrated light-diffusing plate of the present invention.

(4) Deflection amount: A prism-integrated light-diffusing plate having a predetermined thickness was placed on an existing 20-inch direct-type backlight (dimensions: 23.4×30.7 cm), and the amount of deflection of a center portion of the plate toward the inside of the backlight, which deflection occurs under the plate's own weight, was measured by means of a ruler (see FIG. 2).

(5) Transmitted light intensity ratio (a light-intensity distribution indicator evaluation method):

By means of spectrophotometer DDS3000 (product of Nippon Denshoku Industries Co., Ltd.), incident light (F2 light source, field angle of 10°) was entered through the surface of a prism-integrated light-diffusing plate opposite the surface having the prismatic portion, and the ratio of intensity (Y value) of transmitted light as measured at a light-receiving angle of 20° to intensity (Y value) of transmitted light as measured at a light-receiving angle of 0°; i.e., 20°/0° intensity ratio, was obtained.

Example 1

Polycarbonate resin (PC: Toughlon FN1700A, product of Idemitsu Kosan Co., Ltd.; Former Idemitsu Petrochemical Co., Ltd.) (100 parts by mass) serving as a transparent resin was mixed, by means of a mixer, with cross-linked acrylic resin particles (PMMA: MBX-20, product of Sekisui Plastics Co., Ltd., mean particle size: 20 μm) (1 part by mass) serving as a light-diffusing agent, and subsequently, the resultant mixture was subjected to granulation by means of a 40-mm uniaxial kneader/extruder, to thereby yield pellets of a light-diffusing resin material.

The thus-obtained pellets were subjected to extrusion through a T-die molding nozzle by means of a vent-type extruder, to thereby yield a light-diffusing sheet having a thickness (t) of 2 mm.

Figure 3:
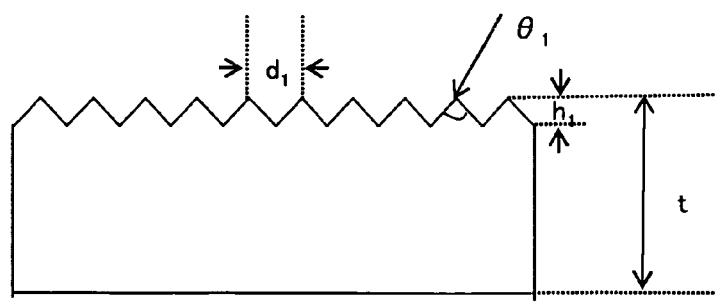
FIG. 3 is an enlarged cross-sectional view showing an embodiment of the prism-integrated light-diffusing plate of the present invention.

Subsequently, by means of the transfer apparatus shown in FIG. 1, microprotrusions with a serrate cross section (linear), each having a bottom width $d_1$ of 50 μm, a height $h_1$ of 25 μm, and a vertical angle $\theta_1$ of 90°, were formed on the thus-obtained light-diffusing sheet at a transfer roller temperature of 210° C., to thereby yield a prism-integrated light-diffusing plate (see FIG. 3).

Example 2

Figure 4:
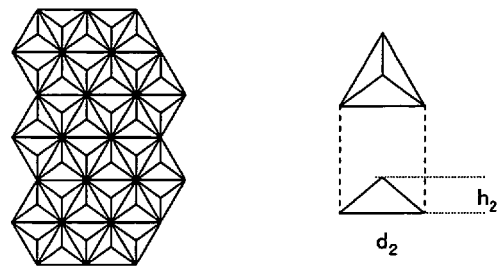
FIG. 4 shows an example of a triangular-pyramid-shaped prismatic portion included in the prism-integrated light-diffusing plate of the present invention.

By means of the transfer apparatus employed in Example 1, equilateral-triangular-pyramid-shaped microprotrusions, each having a bottom width $d_2$ of 50 μm and a height $h_2$ of 40.8 μm, were formed on the light-diffusing sheet obtained in Example 1 (thickness: 2 mm) at a transfer roller temperature of 160° C., to thereby yield a prism-integrated light-diffusing plate (see FIG. 4).

Example 3

Figure 5:
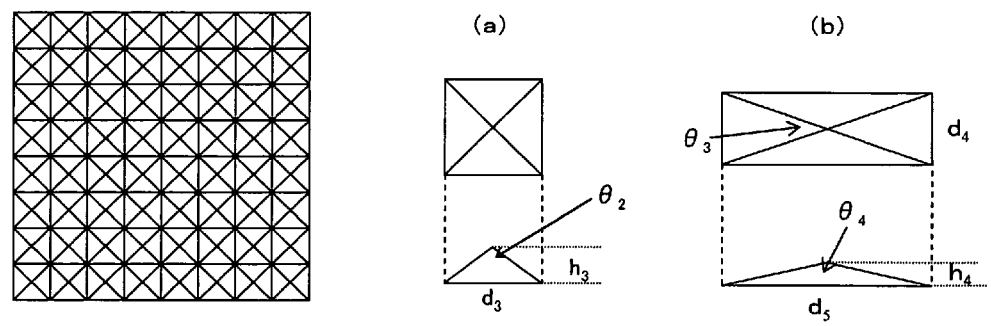
FIGS. 5(a) and 5(b) each show an example of a quadrangular-pyramid-shaped prismatic portion included in the prism-integrated light-diffusing plate of the present invention.

By means of the transfer apparatus employed in Example 1, quadrangular-pyramid-shaped microprotrusions (quadrangular pyramid 1, see FIG. 5a), each having a bottom width $d_3$ of 50 μm, a height $h_3$ of 25 μm, and a vertical angle $\theta_2$ of 90°, were formed on the light-diffusing sheet obtained in Example 1 (thickness: 2 mm) at a transfer roller temperature of 160° C., to thereby yield a prism-integrated light-diffusing plate.

Example 4

By means of the transfer apparatus employed in Example 1, quadrangular-pyramid-shaped microprotrusions (quadrangular pyramid 2, see FIG. 5b), each having a rectangular bottom of 50 μm ($d_4$)×282 μm ($d_5$), a height $h_4$ of 25 μm, a short-side vertical angle $\theta_3$ of 90°, and a long-side vertical angle $\theta_4$ of 160°, were formed on the light-diffusing sheet obtained in Example 1 (thickness: 2 mm) at a transfer roller temperature of 210° C., to thereby yield a prism-integrated light-diffusing plate.

Example 5

By means of the transfer apparatus employed in Example 1, a linear-Fresnel-lens-shaped portion (see FIG. 6) having a pitch $d_6$ of 200 μm and a focal length F of 30 mm was formed on the light-diffusing sheet obtained in Example 1 (thickness: 2 mm) at a transfer roller temperature of 160° C., to thereby yield a linear-Fresnel-lens-integrated light-diffusing plate.

Figure 6:
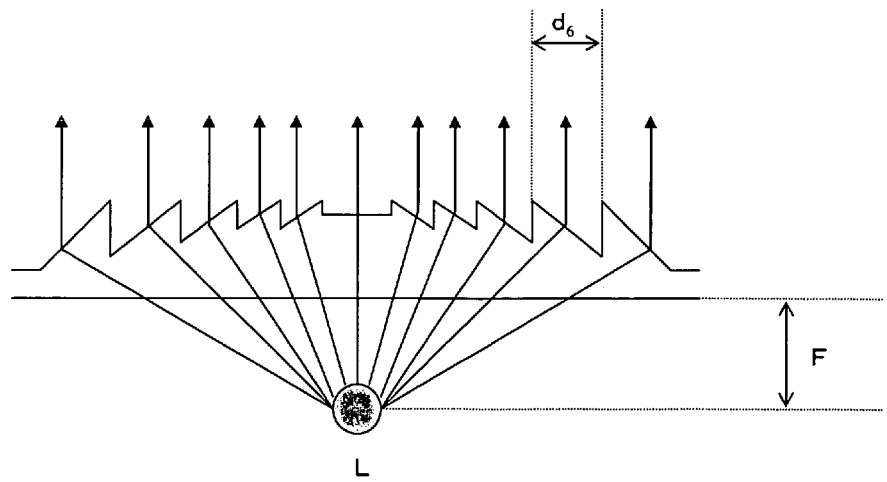
FIG. 6 is an example of a linear-Fresnel-lens-shaped prismatic portion included in the prism-integrated light-diffusing plate of the present invention.

In FIG. 6, reference letter L denotes a line light source.

Example 6

The procedure of Example 1 was repeated, except that the amount of the light-diffusing agent was changed to 3 parts by mass, to thereby yield a prism-integrated light-diffusing plate.

Example 7

The procedure of Example 1 was repeated, except that cross-linked acrylic resin particles (XX03BZ, product of Sekisui Plastics Co., Ltd., mean particle size: 100 μm) (3 parts by mass) were employed as a light-diffusing agent, to thereby yield a prism-integrated light-diffusing plate.

Example 8

The procedure of Example 1 was repeated, except that cross-linked acrylic resin particles (PMMA: MBX-20, product of Sekisui Plastics Co., Ltd., mean particle size: 20 μm) (1 part by mass) and cross-linked acrylic resin particles (PMMA: XX03BZ, product of Sekisui Plastics Co., Ltd., mean particle size: 100 μm) (5 parts by mass) were employed as a light-diffusing agent, to thereby yield a prism-integrated light-diffusing plate.

Example 9

The procedure of Example 1 was repeated, except that cross-linked acrylic resin particles (PMMA: MBX-20, product of Sekisui Plastics Co., Ltd., mean particle size: 20 μm) (2 parts by mass) and short silica fiber (product of Nippon Fiber Glass, fiber diameter: 10 μm, L/D=10) (1 part by mass) were employed as a light-diffusing agent, to thereby yield a prism-integrated light-diffusing plate.

Example 10

The procedure of Example 1 was repeated, except that cross-linked acrylic resin particles (PMMA: MBX-5, product of Sekisui Plastics Co., Ltd., mean particle size: 5 μm) (5 parts by mass) were employed as a light-diffusing agent, and a light-diffusing sheet having a thickness of 0.6 mm was obtained through extrusion, to thereby yield a prism-integrated light-diffusing plate.

Example 11

The procedure of Example 6 was repeated, except that a light-diffusing sheet having a thickness of 1 mm was obtained through extrusion, to thereby yield a prism-integrated light-diffusing plate.

Example 12

The procedure of Example 6 was repeated, except that a light-diffusing sheet having a thickness of 1.5 mm was obtained through extrusion, to thereby yield a prism-integrated light-diffusing plate.

Example 13

A polycarbonate film (Polyca Ace ECG100, product of Tsutsunaka Plastic Industry Co., Ltd.) (thickness: 100 μm) was laminated onto the light-diffusing sheet obtained in Example 1 (thickness: 2 mm), and simultaneously a prism pattern was transferred onto the film in a manner similar to that of Example 1, to thereby yield a prism-integrated light-diffusing plate.

Example 14

A polymethyl methacrylate film (PMMA, Acryplen HBS, product of Mitsubishi Rayon Co., Ltd.) (thickness: 125 μm) was laminated onto the light-diffusing sheet obtained in Example 1 (thickness: 2 mm), and simultaneously a prism pattern was transferred onto the film in a manner similar to that of Example 1, to thereby yield a prism-integrated light-diffusing plate.

Example 15

Polymethyl methacrylate resin (PMMA: Acrypet V, product of Mitsubishi Rayon Co., Ltd.) (100 parts by mass) serving as a transparent resin was mixed, by means of a mixer, with cross-linked styrene resin particles (PS: SBX12, product of Sekisui Plastics Co., Ltd., mean particle size: 12 μm) (2 parts by mass) serving as a light-diffusing agent, and subsequently, the resultant mixture was subjected to granulation by means of a 40-mm uniaxial kneader/extruder, to thereby yield pellets of a light-diffusing material.

The thus-obtained pellets were subjected to extrusion through a T-die molding nozzle by means of a vent-type extruder, to thereby yield a light-diffusing sheet having a thickness (t) of 2 mm.

Subsequently, by means of the transfer apparatus shown in FIG. 1, microprotrusions with a serrate cross section (linear), each having a bottom width $d_1$ of 50 μm, a height $h_1$ of 25 μm, and a vertical angle $\theta_1$ of 90°, were formed on the thus-obtained light-diffusing sheet at a transfer roller temperature of 180° C., to thereby yield a prism-integrated light-diffusing plate.

Example 16

Cycloolefin resin (Zeonor 1060R, product of Zeon Corporation) (100 parts by mass) serving as a transparent resin was mixed, by means of a mixer, with cross-linked styrene resin (SBX12, product of Sekisui Plastics Co., Ltd.) (2 parts by mass) serving as a light-diffusing agent, and subsequently, the resultant mixture was subjected to granulation by means of a 40-mm uniaxial kneader/extruder, to thereby yield pellets of a light-diffusing material.

The thus-obtained pellets were subjected to injection molding by means of a microfabricated die at a cylinder temperature of 250° C. and a die temperature of 80° C., to thereby yield a prism-integrated light-diffusing plate including microprotrusions with a serrate cross section (linear), each having a bottom width $d_1$ of 50 μm, a height $h_1$ of 25 μm, and a vertical angle $\theta_1$ of 90°.

Example 17

Polycarbonate resin (PC: FN1700A, product of Idemitsu Kosan Co., Ltd.; Former Idemitsu Petrochemical Co., Ltd.) (100 parts by mass) serving as a transparent resin was mixed, by means of a mixer, with cross-linked acrylic resin (PMMA: MBX20, product of Sekisui Plastics Co., Ltd.) (1 part by mass) serving as a light-diffusing agent, and subsequently, the resultant mixture was subjected to granulation by means of a 40-mm uniaxial kneader/extruder, to thereby yield pellets of a light-diffusing material.

The thus-obtained pellets were subjected to injection molding by means of a microfabricated die at a cylinder temperature of 250° C. and a die temperature of 80° C., to thereby yield a prism-integrated light-diffusing plate including microprotrusions with a serrate cross section (linear), each having a bottom width $d_1$ of 50 μm, a height $h_1$ of 25 μm, and a vertical angle $\theta_1$ of 90°.

Example 18

Polycarbonate resin (PC: FN1700A, product of Idemitsu Kosan Co., Ltd.; Former Idemitsu Petrochemical Co., Ltd.)

(100 parts by mass) serving as a transparent resin was mixed, by means of a mixer, with cross-linked acrylic resin (PMMA: MBX20, product of Sekisui Plastics Co., Ltd.) (1 part by mass) serving as a light-diffusing agent, and subsequently, the resultant mixture was subjected to granulation by means of a 40-mm uniaxial kneader/extruder, to thereby yield pellets of a light-diffusing material.

The thus-obtained pellets were subjected to extrusion through a T-die molding nozzle by means of a vent-type extruder, to thereby yield a light-diffusing sheet having a thickness (t) of 2 mm.

Subsequently, the below-described UV-curable resin composition was applied to an aluminum die having a prism pattern similar to that described in Example 1, and the surface of the thus-applied composition was smoothed. Thereafter, the above-obtained light-diffusing sheet was placed on the UV-curable resin composition, and the composition was cured through illumination with UV rays of 320 to 390 nm (cumulative UV dose: 1,000 mJ/cm$^2$).

The thus-cured resin composition was removed from the die together with the light-diffusing sheet, to thereby yield a prism-integrated light-diffusing plate including microprotrusions with a serrate cross section (linear), each having a bottom width $d_1$ of 50 μm, a height $h_1$ of 25 μm, and a vertical angle $\theta_1$ of 90°.

<UV-Curable Resin Composition>

A mixture of ethylene-oxide-modified bisphenol A methacrylate resin (Fancryl FA-321, product of Hitachi Chemical Co., Ltd.) (100 parts by mass) and 2-hydroxy-2-methyl-1-phenylpropan-1-one (Darocure 1173, product of Merck Ltd., Japan) (3 parts by mass).

Example 19

A photostabilizer (UWR UV-G12, product of Nippon Shokubai Co., Ltd.) was diluted with diacetone alcohol so that the solid content was 20 mass %. The thus-obtained solution was applied, by means of a bar coater, onto one surface (the surface opposite the surface onto which a prism pattern was to be transferred) of the light-diffusing sheet obtained in Example 1 (thickness: 2 mm) so that the thickness of a coating film was 5 μm.

In a manner similar to that of Example 1, a prism pattern was transferred onto the surface opposite the thus-coated surface, to thereby yield a light-resistant prism-integrated light-diffusing plate.

Comparative Example 1

The procedure of Example 1 was repeated, except that cross-linked acrylic resin particles (PMMA: MBX5, product of Sekisui Plastics Co., Ltd., mean particle size: 5 μm) (5 parts by mass) were employed as a light-diffusing agent, to thereby yield a prism-integrated light-diffusing plate.

Comparative Example 2

The procedure of Example 1 was repeated, except that cross-linked acrylic resin particles (PMMA: XX02BZ, product of Sekisui Plastics Co., Ltd., mean particle size: 200 μm) (0.5 parts by mass) were employed as a light-diffusing agent, and a light-diffusing sheet having a thickness (t) of 1 mm was formed, to thereby yield a prism-integrated light-diffusing plate.

Comparative Example 3

The procedure of Example 1 was repeated, except that cross-linked acrylic resin particles (PMMA: XX02BZ, product of Sekisui Plastics Co., Ltd., mean particle size: 200 μm) (0.5 parts by mass) were employed as a light-diffusing agent, and a light-diffusing sheet having a thickness (t) of 0.2 mm was formed, to thereby yield a prism-integrated light-diffusing plate.

Comparative Example 4

The procedure of Example 1 was repeated, except that cross-linked acrylic resin particles (PMMA: MBX20, product of Sekisui Plastics Co., Ltd., mean particle size: 20 μm) (1 part by mass) were employed as a light-diffusing agent, and a light-diffusing sheet having a thickness (t) of 5 mm was formed, to thereby yield a prism-integrated light-diffusing plate.

Tables 1-1 and 1-2 show the results of evaluation of the prism-integrated light-diffusing plates obtained in the aforementioned Examples and Comparative Examples.

In the column "prism pattern transfer" of Tables 1-1 and 1-2, "A" corresponds to transfer by means of a belt, "B" injection molding, and "C" transfer onto a cured transparent resin layer.

TABLE 1-1

|  | Transparent resin | Thickness (mm) | Light-diffusing agent | | | Total light transmittance % | Distribution indicator 20°/0° | Haze % |
|---|---|---|---|---|---|---|---|---|
|  |  |  | Type | Particle size | Amount |  |  |  |
| Ex. 1 | FN1700 | 2 | Cross-linked PMMA particles | 20 μm | 1 | 94 | 0.06 | 85 |
| Ex. 2 | FN1700 | 2 | Cross-linked PMMA particles | 20 μm | 1 | 94 | 0.06 | 85 |
| Ex. 3 | FN1700 | 2 | Cross-linked PMMA particles | 20 μm | 1 | 94 | 0.06 | 85 |
| Ex. 4 | FN1700 | 2 | Cross-linked PMMA particles | 20 μm | 1 | 94 | 0.06 | 85 |
| Ex. 5 | FN1700 | 2 | Cross-linked PMMA particles | 20 μm | 1 | 94 | 0.06 | 85 |
| Ex. 6 | FN1700 | 2 | Cross-linked PMMA particles | 20 μm | 3 | 80 | 0.6 | 93 |

TABLE 1-1-continued

| | | | | | | | | |
|---|---|---|---|---|---|---|---|---|
| Ex. 7 | FN1700 | 2 | Cross-linked PMMA particles | 100 μm | 3 | 94 | 0.02 | 73 |
| Ex. 8 | FN1700 | 2 | Cross-linked PMMA particles | 20 μm | 1 | 88 | 0.3 | 90 |
| | | | Cross-linked PMMA particles | 100 μm | 5 | | | |
| Ex. 9 | FN1700 | 2 | Cross-linked PMMA particles | 20 μm | 2 | 82 | 0.3 | 94 |
| | | | Silica fiber | Diameter: 10 μm (L/D: 10) | 1 | | | |
| Ex. 10 | FN1700 | 0.6 | Cross-linked PMMA particles | 5 μm | 5 | 85 | 0.2 | 90 |
| Ex. 11 | FN1700 | 1 | Cross-linked PMMA particles | 20 μm | 3 | 85 | 0.3 | 80 |

| | | Before prism pattern transfer | | After prism pattern transfer | | | |
|---|---|---|---|---|---|---|---|
| | Prism Pattern transfer | Average brightness (candela/cm$^2$) | Brightness unevenness | Prism pattern | Average brightness (candela/cm$^2$) | Brightness unevenness | Deflection amount (mm) |
| Ex. 1 | A | 13000 | 3000 | Linear | 14900 | 1500 | <0.5 |
| Ex. 2 | A | 13000 | 3000 | Triangular pyramid | 14500 | 900 | <0.5 |
| Ex. 3 | A | 13000 | 3000 | Quadrangular pyramid 1 | 14600 | 500 | <0.5 |
| Ex. 4 | A | 13000 | 3000 | Quadrangular pyramid 2 | 14300 | 400 | <0.5 |
| Ex. 5 | A | 13000 | 3000 | Fresnel lens | 15000 | 300 | <0.5 |
| Ex. 6 | A | 12000 | 2000 | Linear | 13500 | 800 | <0.5 |
| Ex. 7 | A | 13000 | 6000 | Linear | 16000 | 2000 | <0.5 |
| Ex. 8 | | 12500 | 3000 | Linear | 16000 | 1500 | <0.5 |
| Ex. 9 | A | 12500 | 1800 | Linear | 13500 | 500 | <0.5 |
| Ex. 10 | A | 11000 | 5500 | Linear | 13500 | 4000 | 1 |
| Ex. 11 | A | 14000 | 4000 | Linear | 15500 | 2500 | 0.8 |

TABLE 1-2

| | Transparent resin | Thickness (mm) | Light-diffusing agent | | | Total light transmittance % | Distribution indicator 20°/0° | Haze % |
|---|---|---|---|---|---|---|---|---|
| | | | Type | Particle size | Amount | | | |
| Ex. 12 | FN1700 | 1.5 | Cross-linked PMMA particles | 20 μm | 3 | 82 | 0.5 | 78 |
| Ex. 13 | FN1700 | 2 | Cross-linked PMMA particles | 20 μm | 1 | 94 | 0.06 | 85 |
| Ex. 14 | FN1700 | 2 | Cross-linked PMMA particles | 20 μm | 1 | 94 | 0.06 | 85 |
| Ex. 15 | Acrypet V | 2 | Cross-linked PS particles | 12 μm | 2 | 90 | 0.3 | 85 |
| Ex. 16 | Zeonor 1060R | 2 | Cross-linked PS particles | 12 μm | 2 | 85 | 0.3 | 80 |
| Ex. 17 | FN1700 | 2 | Cross-linked PMMA particles | 20 μm | 1 | 94 | 0.06 | 85 |
| Ex. 18 | FN1700 | 2 | Cross-linked PMMA particles | 20 μm | 1 | 94 | 0.06 | 85 |
| Ex. 19* | FN1700 | 2 | Cross-linked PMMA particles | 20 μm | 1 | 93 | 0.06 | 86 |
| Comp. Ex. 1 | FN1700 | 2 | Cross-linked PMMA particles | 5 μm | 5 | 50 | 0.95 | 96 |
| Comp. Ex. 2 | FN1700 | 1 | Cross-linked PMMA particles | 200 μm | 0.5 | 97 | 0.01 | 68 |
| Comp. Ex. 3 | FN1700 | 0.2 | Cross-linked PMMA particles | 5 μm | 5 | 90 | 0.1 | 85 |
| Comp. Ex. 4 | FN1700 | 5 | Cross-linked PMMA particles | 20 μm | 1 | 55 | 0.99 | 85 |

TABLE 1-2-continued

| | Prism Pattern transfer | Before prism pattern transfer | | After prism pattern transfer | | | |
|---|---|---|---|---|---|---|---|
| | | Average brightness (candela/cm$^2$) | Brightness unevenness | Prism pattern | Average brightness (candela/cm$^2$) | Brightness unevenness | Deflection amount (mm) |
| Ex. 12 | A | 13500 | 3500 | Linear | 15000 | 1500 | 0.6 |
| Ex. 13 | A | 13000 | 3000 | Linear | 14900 Transfer on laminated PC film (100 μm) | 1500 | <0.5 |
| Ex. 14 | A | 13000 | 3000 | Linear | 15000 Transfer on laminated PMMA film (100 μm) | 900 | <0.5 |
| Ex. 15 | A | 16000 | 2500 | Linear | 17800 | 1000 | <0.5 |
| Ex. 16 | B | 15000 | 3000 | Linear | 16500 | 1500 | <0.5 |
| Ex. 17 | B | 13000 | 3000 | Linear | 14500 | 1500 | <0.5 |
| Ex. 18 | C | 13000 | 3000 | Linear | 15000 | 1500 | <0.5 |
| Ex. 19* | A | 13000 | 3000 | Linear | 14900 | 1500 | <0.5 |
| Comp. Ex. 1 | A | 9000 | 1000 | Linear | 9500 | 1000 | <0.5 |
| Comp. Ex. 2 | A | 13000 | 7000 | Linear | 14000 | 7000 | <0.5 |
| Comp. Ex. 3 | A | 12000 | 6000 | Linear | 14000 | 4000 | 4 |
| Comp. Ex. 4 | A | 9500 | 3000 | Linear | 10000 | 2500 | <0.5 |

*Photostabilizer (UWR UV-G12, product of Nippon Shokubai Co., Ltd.) was applied to one surface of the light-diffusing sheet so that the coating film thickness was 5μ

As is clear from Tables 1-1 and 1-2, each of the prism-integrated light-diffusing plates of Examples 1 through 18, which are produced through prism pattern transfer, exhibits excellent brightness, diffusivity, and self-supportability.

In contrast, in Comparative Example 1, brightness is not considerably increased after prism pattern transfer, whereas in Comparative Example 2, brightness unevenness is not reduced.

In Comparative Example 3, the deflection amount of the light-diffusing plate is large when the plate is incorporated into a backlight. In Comparative Example 4, the light-diffusing sheet, which has the same composition as that of Example 1 but is thicker than that of Example 1, exhibits lowered light transmittance due to its large thickness, and the prism-pattern-transferred sheet does not exhibit increased brightness.

In addition, when the thickness of the light-diffusing sheet exceeds 3 mm, the mass of a backlight per se increases, and assembly of the backlight, which is often carried out manually at present, becomes difficult.

INDUSTRIAL APPLICABILITY

The prism-integrated light-diffusing plate of the present invention, which is formed of a single-layer sheet of small thickness, exhibits improved light diffusivity and brightness without causing impairment of these properties (such improvement has conventionally been achieved by means of a plurality of sheets or films). Therefore, the prism-integrated light-diffusing plate enables simplification of a production process and reduction of production cost. In addition, the light-diffusing plate diffuses light uniformly, and greatly increases the brightness of a backlight of a liquid crystal display or the like.

The invention claimed is:

1. A prism-integrated light-diffusing plate, comprising a prismatic portion formed of a plurality of prism-shaped protrusions provided on at least one surface of a light-diffusing sheet, said light diffusing sheet comprising a transparent resin material and a light-diffusing agent and having a thickness of 0.5 to 3 mm and a total light transmittance of 60 to 95%,
wherein the light-diffusing agent is present in the form of particles having a mean particle size of 1 to 200 μm and/or present in the form of fibers having a length to diameter ratio (L/D) of 2 or more, the amount of the light-diffusing agent in the light diffusing sheet is 0.1 to 20 parts by mass on the basis of 100 parts by mass of the transparent resin material, and the light-diffusing agent is selected from the group consisting of a thermoplastic acrylic resin, a polystyrene resin, a cross-linked acrylic resin, a cross-linked polystyrene resin, a silicone resin, a fluorocarbon resin, silica, quartz, and combinations thereof,
further provided that when light enters a surface opposite the surface having the prismatic portion in a direction perpendicular to the opposite surface, the ratio of intensity of transmitted light as measured in a direction 20° from the perpendicular direction to intensity of transmitted light as measured in the perpendicular direction i.e., a light-intensity distribution indicator, is 0.02 to 0.7.

2. A prism-integrated light-diffusing plate as described in claim 1, wherein the amount of the light-diffusing agent contained in the transparent resin material is 0.5 to 15 parts by mass on the basis of 100 parts by mass of a transparent resin constituting the resin material.

3. A prism-integrated light-diffusing plate as described in claim 1, wherein the transparent resin material is a polycarbonate resin, the light-diffusing agent comprises thermoplastic acrylic resin particles, cross-linked acrylic resin particles, and quartz fiber.

4. A prism-integrated light-diffusing plate as described in claim 3, wherein the light-diffusing sheet has a thickness of 0.6 to 2 mm.

5. A prism-integrated light-diffusing plate as described in claim 1, wherein the prismatic portion is formed directly on the light-diffusing sheet.

6. A method for producing a prism-integrated light-diffusing plate as recited in claim 5, comprising:
- an emboss-pattern-transfer including placing a light-diffusing sheet on the surface of an embossing sheet having a prism pattern, and pressing the embossing sheet and the light-diffusing sheet with a pair of rollers provided on the respective sides of the opposite surfaces of the embossing sheet, to thereby transfer the prism pattern onto the light-diffusing sheet;
- conveying the embossing sheet and the pattern-transferred sheet by an endless belt which is supported by at least one of the rollers; and
- removing the pattern-transferred sheet from the embossing sheet after the conveying.

7. A prism-integrated light-diffusing plate as described in claim 1, wherein the prismatic portion is formed through melt-adhesion of a transparent resin sheet onto the light-diffusing sheet.

8. A method for producing a prism-integrated light-diffusing plate as recited in claim 7, comprising:
- an emboss-pattern-transfer including providing a transparent resin sheet between a light-diffusing sheet and the surface of an embossing sheet having a prism pattern, and pressing the embossing sheet and the light-diffusing sheet with a pair of rollers provided on the respective sides of the opposite surfaces of the embossing sheet, to thereby transfer the prism pattern onto the transparent resin sheet, and to melt-adhere the resin sheet to the light-diffusing sheet;
- conveying the embossing sheet and the pattern-transferred and melt-adhered sheet by an endless belt which is supported by at least one of the rollers; and
- removing the pattern-transferred and melt-adhered sheet from the embossing sheet after the conveying step.

9. A prism-integrated light-diffusing plate as described in claim 1, wherein, when light enters the surface opposite the surface having the prismatic portion in a direction perpendicular to the opposite surface, the ratio of intensity of transmitted light as measured in a direction 20° from the perpendicular direction to intensity of transmitted light as measured in the perpendicular direction; i.e., a light-intensity distribution indicator, is 0.1 to 0.6.

10. A prism-integrated light-diffusing plate as described in claim 1, wherein the light-diffusing sheet has a thickness of 0.6 to 2 mm.

11. A prism-integrated light-diffusing plate as described in claim 1, wherein the light-diffusing agent comprises particles having a mean particle size of 1 to 200 μm.

12. A prism-integrated light-diffusing plate as described in claim 1, wherein the light-diffusing agent comprises fibers having a length to diameter ratio (L/D) of 2 or more.

13. A prism-integrated light-diffusing plate as described in claim 1, wherein the light-diffusing agent comprises particles having a mean particle size of 1 to 200 μm and fibers having a length to diameter ratio (L/D) of 2 or more.

14. A prism-integrated light-diffusing plate as described in claim 1, wherein the light-diffusing agent comprises particles having a mean particle size of 3 to 100 μm.

15. A prism-integrated light-diffusing plate as described in claim 1, wherein the light-diffusing agent comprises fibers having a length to diameter ratio (L/D) of 2 to 100.

16. A prism-integrated light-diffusing plate as described in claim 1, wherein the light-diffusing agent comprises particles having a mean particle size of 3 to 100 μm and fibers having a length to diameter ratio (L/D) of 2 to 100.

* * * * *